US006330737B1

(12) United States Patent
Lowemark

(10) Patent No.: US 6,330,737 B1
(45) Date of Patent: Dec. 18, 2001

(54) TOOL FOR MOUNTING DISK VALVES IN MOTOR CYLINDER HEADS

(75) Inventor: Bengt Lowemark, Ljusdal (SE)

(73) Assignee: Trego Maskin AB, Ljusdal (SE)

( * ) Notice: Subject to any disclaimer, the term of this patent is extended or adjusted under 35 U.S.C. 154(b) by 0 days.

(21) Appl. No.: 09/509,355

(22) PCT Filed: Sep. 9, 1998

(86) PCT No.: PCT/SE98/01595

§ 371 Date: Mar. 27, 2000

§ 102(e) Date: Mar. 27, 2000

(87) PCT Pub. No.: WO99/16586

PCT Pub. Date: Apr. 8, 1999

(30) Foreign Application Priority Data

Sep. 26, 1997 (SE) .................................................. 9703509

(51) Int. Cl.[7] ..................................................... B23P 19/04

(52) U.S. Cl. ............................ 29/214; 29/213.1; 29/278; 29/280; 29/238

(58) Field of Search .................................. 29/213.1, 214, 29/215, 217, 220, 239, 238, 278, 280

(56) References Cited

U.S. PATENT DOCUMENTS

| | | | | |
|---|---|---|---|---|
| 4,667,388 | * | 5/1987 | Browning | 29/275 |
| 5,090,102 | * | 2/1992 | Lovell | 29/255 |
| 5,097,579 | | 3/1992 | Pringault . | |
| 5,752,308 | * | 5/1998 | Maley et al. | 29/213.1 |
| 5,761,785 | * | 6/1998 | Connolly | 29/213.1 |
| 5,915,740 | * | 6/1999 | Weitner | 29/213.1 |
| 5,996,201 | * | 12/1999 | Ringle | 29/213.1 |

FOREIGN PATENT DOCUMENTS

| | | |
|---|---|---|
| 392989 | 6/1933 | (GB) . |
| 2 292 988 | 3/1996 | (GB) . |

* cited by examiner

*Primary Examiner*—Joseph J. Hail, III
*Assistant Examiner*—Lee Wilson
(74) *Attorney, Agent, or Firm*—Young & Thompson

(57) ABSTRACT

A tool for mounting of disk valves in motor cylinder heads includes a shaft and a spring-loaded tap that may be pressed into the shaft, and two vaulted clamping arms placed on opposite sides of the shaft, with the purpose of holding two locking bodies in connection with the occasion when these bodies are to be transferred to the rod of the valve. On the individual clamping arm there are protrusions that protrude relative to an axially straight inside on the clamping arm and serve as carriers for the individual locking body. Each protrusion has support surfaces that are obliquely positioned relative to the clamping arm in order to hold a convexly vaulted outside on the locking body placed against the concave inside of the clamping arm, when the locking body is dislocated from the tap to grooves in the valve rod, thereby distancing the front edge of the locking body from the external envelope surface of the valve rod.

7 Claims, 3 Drawing Sheets

TOOL FOR MOUNTING DISK VALVES IN MOTOR CYLINDER HEADS

BACKGROUND OF THE INVENTION

This invention relates to a tool for mounting disk valves in motor cylinder heads, the disk valves being of the type that on its rod has a number of transversal, circumferential grooves for accomodating a corresponding number of beads on the insides of two substantially semi-circularly shaped locking bodies, which taper conically from the rear ends towards the front ends and which have the purpose of securing a locking ring against the valve spring, comprising a shaft, which in the region of one end has on one hand a spring-loaded tap, that is pressable into an outer cavity in the end portion of the shaft, and on the other hand two cross-sectionally vaulted clamping arms that are placed on opposed sides of the shaft, which clamping arms are articulatedly connected with the shaft and activated by at least one spring means that always strives to keep the arms swivelled inwards against the shaft, and against the action of which the clamping arms are pivotable outwards to a position distal from the shaft and the tap, the clamping arms in the region of the free ends having means for keeping said locking bodies in a given axial position relative to the clamping arms, in order to make possible a transfer of the locking bodies to the valve rod, more precisely by positioning the tap against the rod and pressing the same into the cavity of the shaft.

DESCRIPTION OF THE RELATED ART

A tool of the type referred to above is commercially available since a long time ago. According to this known tool, the holding means for the locking bodies consist of partly conically shaped seats in the region of the two free, front ends of the clamping arms. More specifically, the clamping arms consist of thin, punched and compression-moulded sheets of metal, which in connection with the compression moulding are shaped with a partly conical portion that at the back transposes into an axially straight (although cross-sectionally vaulted) portion and that tapers in a direction forwards from the transposition portion. The purpose of the individual seat is to accomodate the individual locking body in the same, with its external convex envelope surface being turned towards the inside of the seat and its concave inside turned towards the external envelope surface of the spring tap or the valve rod, respectively, and oriented parallel to the same. However, due to production-technical reasons, the semi-annularly shaped transposition portion between the rear end of the seat and the straight part of the clamping arm behind obtains a generally rounded shape, the sheet-metal in this transposition portion generally extending at an obtuse angle to the longitudinal extension of the clamping arm. In practice, this has the consequence that the tool functions in an insatisfactory way, more specifically due to the fact that forces are applied to the individual locking bodies, which forces tend to press the lower sharp edge on the front end of the locking body against the envelope surface on the valve rod. Therefore, when the locking body reaches the groove or grooves in the valve rod, this front edge tends to engage into the groove, before the beads on the insides of the locking bodies have engaged with the grooves. It is true that sometimes the front edge may slide past the groove, but too often it occurs precisely that the front edge gets caught in the groove. Some valve rods comprise only one single groove for engagement with one single bead on the inside of the locking body, while other rods may comprise several mutually separated grooves for engagement with a corresponding number of beads on the locking bodies. In the latter cases, the known tool is particularly difficult to handle, in that the front edges of the locking bodies easily get caught in the additional grooves, even if they by chance would slide past the first groove. Another deficiency of the known tool is that it is comparatively expensive to manufacture, inter alia due to the fact that each clamping arm requires its own screw compression spring, calling for separate assembling operations.

BRIEF SUMMARY OF THE INVENTION

The present invention aims at removing the above mentioned deficiencies of the previously known tool and creating an improved mounting tool for disk valves. Thus, a primary object of the present invention is to create a tool that in a reliable way is capable of bringing the locking bodies to a position, in which their beads may be smoothly brought into a distinct engagement with the groove or grooves in the valve rod, without the front edges of the locking bodies first tending to get caught therein. This shall be possible to realize independently of the number of grooves in the valve rod. Another object is to create a tool that is constructively simple and inexpensive to manufacture.

According to the invention, at least the primary object is attained by the features that are defined in the characterizing clause of claim 1. Advantageous embodiments of the invention are further defined in the dependent claims.

DETAILED DESCRIPTION OF A PREFERRED EMBODIMENT OF THE INVENTION

Figure 1:
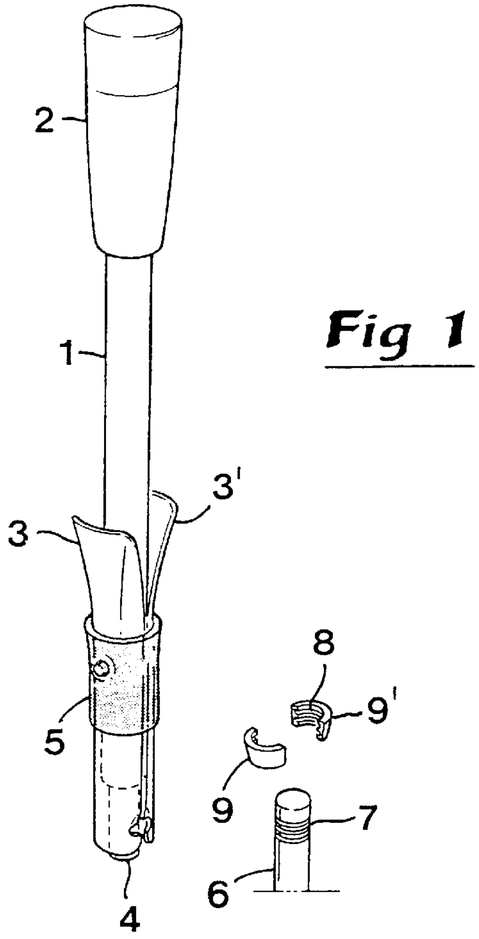
FIG. 1 is a perspective view of on one hand a tool according to the invention, and on the other hand parts of a disk valve.

The tool shown in FIG. 1 comprises a shaft 1 which at one end has a handle-like cap 2 and at its opposed end comprises two clamping arms 3, 3'. In practice, the shaft 1 may consist of a metal tube with a cylindrical envelope surface. In a cavity in the front end (directed downwards in FIG. 1) of the shaft tube there is introduced a cylinder-shaped tap 4 that is spring-loaded, more specifically by a not shown spring mounted in the cavity, which spring steadily strives to bring out the tap to an outer end position. In other terms, the pressing-in of the tap into the cavity takes place against the action of this spring. The two clamping arms 3, 3', which will be described in more detail with reference to FIGS. 4 to 10, are enclosed by an elastic sleeve 5, which forms a spring means that steadily strives to keep the front parts of the arms springingly pressed against the envelope surface of the shaft.

In FIG. 1, also an upper end of a valve rod 6 is shown, which in a manner known per se has a number of transversally positioned, circumferential grooves 7. These grooves are intended to accomodate a corresponding number of beads 8 on the inside of two locking bodies 9, 9', which have the purpose of locking the valve in question in a cylinder head.

Figure 2:
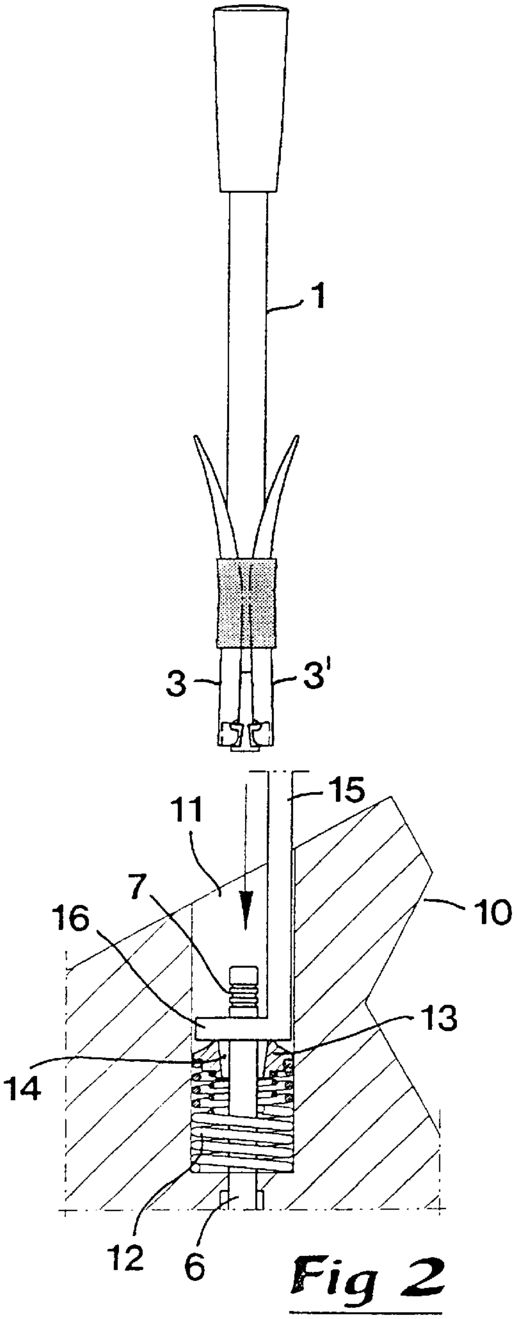
FIG. 2 is an exploded view showing on one hand a partial section of a cylinder head and a disk valve mounted therein, and on the other hand a side view of the tool according to the invention in connection with the locking of the valve.
Figure 3:
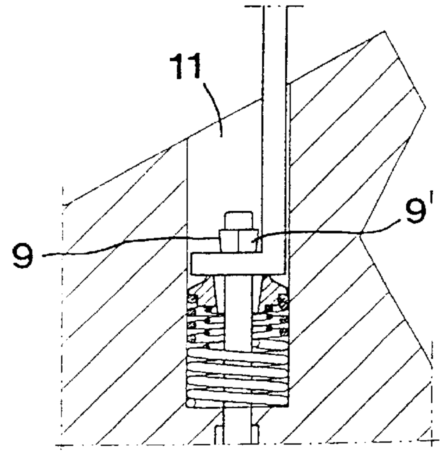
FIG. 3 is an analogous section showing the valve after locking.

In FIGS. 2 and 3 a portion of a cylinder head 10 is shown, in which there is a cavity 11, into which at least a screw compression spring 12 may be introduced. In order to lock the valve rod 6 relative to the spring 12, a locking ring 13 is used, which has a conical, upwardly widening seat 14 for receiving the two locking bodies 9, 9'. A compression of the spring 12 may be effected by means of a presser means 15 with a ring-shaped ferrule 16 that may be pressed against the locking ring 13, at the same time as it permits the upper end of the valve rod 6 to protrude a bit from the locking ring. In the cylinder heads of modern motors, the cavities 11 are normally deep and narrow, which involves that the area around the grooves 7 is difficult to access, particularly in view of the fact that the presser means and the ferrule 16 claim a considerable part of the space. Since it is practically impossible to manually, by means of the fingers of the hand, bring the locking bodies 9, 9' into engagement with the grooves, the special mounting tool has to be used.

As far as the shown tool and its use in connection with mounting has hitherto been described, the same (with the exception of sleeve 5) is substantially previously known. In contrast to the previously known tool, which has partly conically compression-moulded portions in the area of the frontal free ends of the clamping arms 3, 3', the tool according to the invention is shaped in the way described hereinafter.

The two clamping arms, which in a way known per se are made by punching and compression-moulding of relatively thin sheet-metal, comprise front sections or parts 17 that are axially straight, albeit cross-sectionally vaulted or arched. In practice, the cross-sectional shape is substantially semi-circular. The straight end section 17 has two opposed longitudinal edges 18, in which there are provided recesses 19. As may be best seen in FIGS. 7 and 9, the sheet material immediately behind each such recess 19 is bent inwards, thereby forming tab-like protrusions 20, which serve as carriers for each locking body 9, 9'. The front edge surface 21 on each inwardly bent tab portion forms a support surface for bearing against the locking body. As may be seen in FIG. 10, the individual locking body has a conically tapering shape. More specifically, the concave inside 22 of the locking body is generally cylinder-shaped, while the convex outside 23 has a conical basic shape. This implies that the rear end designated 24 of the locking body is larger than the front end 25.

Figure 7:
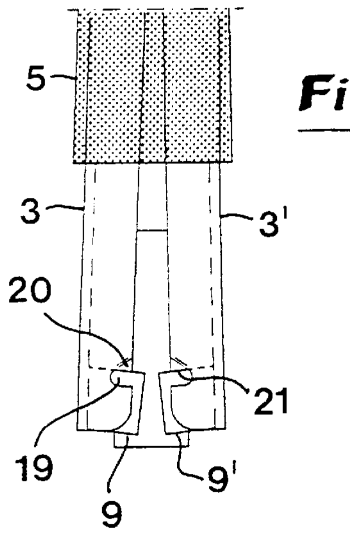
FIG. 7 is an enlarged, partial side view illustrating how the clamping arms clamp the two locking bodies that shall lock the valve in the cylinder head.
Figure 8:
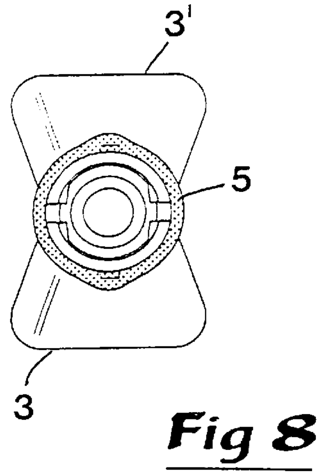
FIG. 8 is an enlarged end view of the tool.
Figure 9:
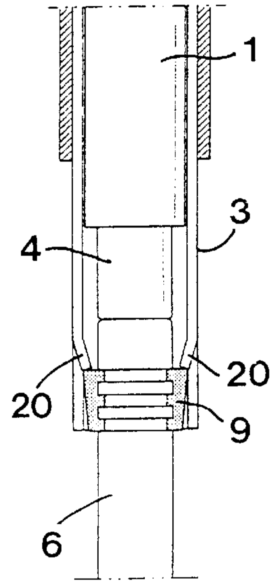
FIG. 9 is an analogous, partly cut side view turned by 90° relative to FIG. 7.
Figure 10:
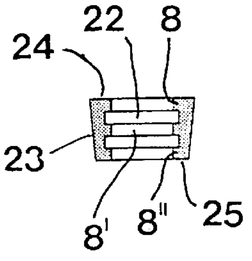
FIG. 10 is a side view of an individual locking body.
Figure 11:
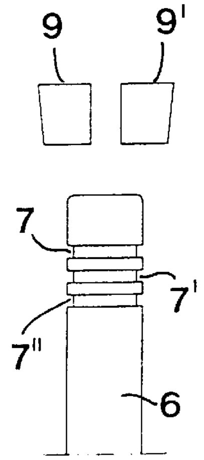
FIG. 11 is an exploded view showing two locking bodies separated from the valve rod.

According to the shown embodiment example, three axially separated grooves 7, 7' and 7'' (see FIG. 11) are provided in the valve rod 6. Therefore, on the inside of the locking body 9 are provided three transversal beads 8, 8', 8'', each one being intended to engage into a separate groove. In order to maintain the outer surface of the locking bodies in abutment with the concave inside of the clamping arms 3, 3', as shown in FIG. 7, the above mentioned edge surfaces 21 are obliquely positioned relative to longitudinal extension of the clamping arms. In practice, the individual edge surface is obliquely positioned at an acute angle within the range of 60 to 85°, preferably 70 to 75°, relative to the longitudinal axis of the individual clamping arm. This oblique positioning of the edge surface guarantees that the two sheet-metal tabs 20 serving as carriers will be pressed against the rear end 24 of the individual locking body, in the region of its surface portion that is located closest to the center, whereby the locking body is submitted to forces which always strive to tip or swing out the locking body, so that its front, narrow end 25 is distanced from the envelope surface on the tap 4 and the valve rod 6, respectively, when the locking body is to be brought into engagement with the groove in the valve rod.

Figure 4:
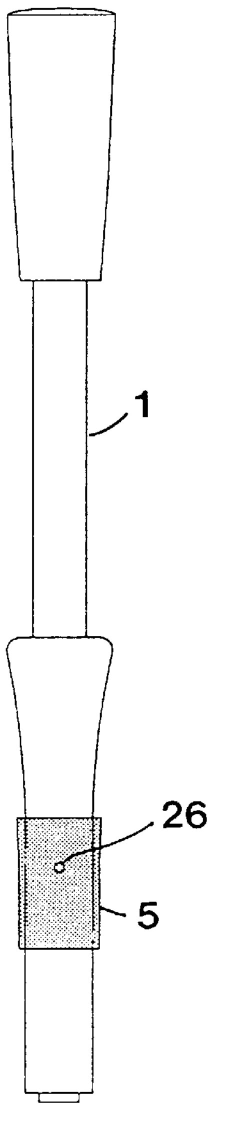
FIG. 4 is an enlarged side view of the tool.
Figure 5:
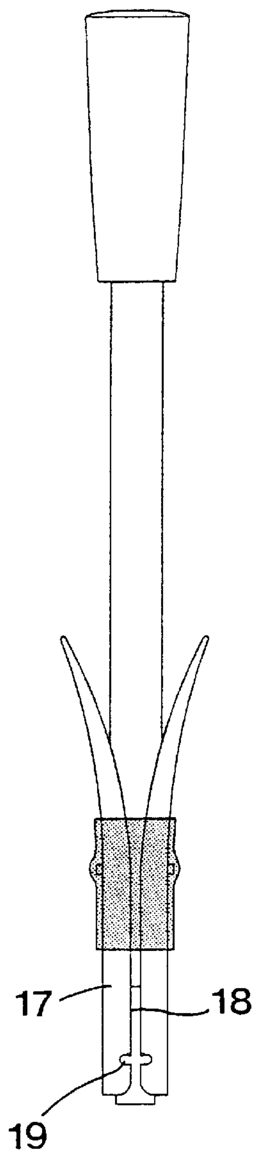
FIG. 5 is an analogous side view showing the same tool turned by 90°.
Figure 6:
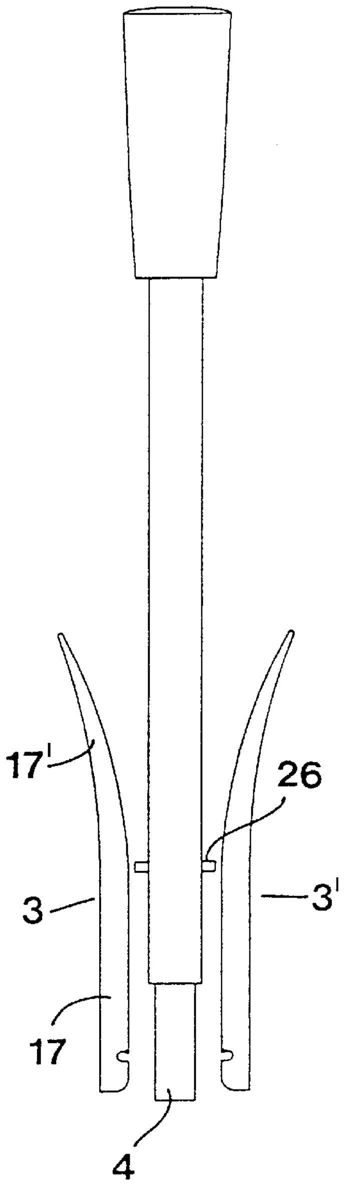
FIG. 6 is an exploded view showing two clamping arms comprised in the tool and separated from the tool shaft.

With reference to FIGS. 4 to 6, it should be noted that the front, straight section 17 of each clamping arm 3, 3' transposes into a rear section 17' with an arched basic shape. The individual clamping arm is connected to the shaft 1 via a pin 26 protruding radially from said shaft, which pin extends through a hole (not shown) recessed in the clamping arm. This hole is placed in the transposition area between the straight arm section 17 and the arched section 17'. In order to keep the straight front end sections of the clamping arms springingly pressed in the direction of the envelope surfaces on the shaft 1 and the tap 4, the elastic sleeve 5 is applied to the outside of the clamping arms. The major part of this sleeve encloses the straight sections of the clamping arms, whereby these are resiliently pressed against the shaft due to the elasticity of the sleeve material, which may consist of rubber.

When the valve is to be mounted for active operation in the cylinder head 10, the valve rod 6 is put up into the cavity 11, and the valve spring 12 and the locking ring 13 are let down into the bottom of the cavity. In the next step, the spring 12 is compressed by means of the presser means 15, whereby the grooves in the valve rod are exposed in the region above the locking ring and the ferrule 16. In order to lock the locking ring relative to the valve rod, the two locking bodies 9, 9' shall be brought into engagement with the grooves, to be eventually accomodated in the conical seat 14 in the locking device.

Figure 12:
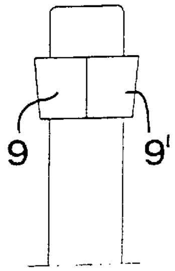
FIG. 12 is an analogous side view showing the locking bodies in a locked state.

The mounting of the locking bodies is brought about in the following way. In a first stage, the locking bodies 9, 9' are inserted between the outside of the spring-loaded tap 4 and the inside of the free end portions of the clamping arms 3, 3'. More specifically, the locking bodies are inserted in such a way that the rear large ends 24 of the locking bodies are placed against the obliquely positioned edge surfaces 21 on the carrier tabs 20, as shown in FIG. 7. Thereafter, the tool is led down into the cavity 11 and the end of the tap 4 is abutted against the end of the valve rod 6. A continued pressing down of the tool leads to the tap 4 being pressed into the interior of the tool shaft, at the same time as the clamping arms continue their axial movement relative to the valve rod. In that connection, the carrier tabs 20 attend to it that each individual locking body be carried in the axial direction. In a first step, this axial movement brings about that the locking bodies are transferred from the tap 4 to the valve rod, to eventually arrive at the grooves in the valve rod. By the fact that the locking bodies are kept swivelled out by means of the carrier tabs as shown in FIG. 7, the narrow front ends of the locking bodies will be distanced from the envelope surface of the valve rod, which implies that the sharp inner edge of the front edges of the locking bodies will not get caught in the boundary section between the tap 4 and the valve rod 6, nor in any of the two first grooves 7, 7'. Only when the locking bodies reach the exact, desired position vis-à-vis the grooves, the rear bead 8 on the inside of the locking bodies will engage into the rear groove 7 and sink into it. When this occurs, also the beads 8', 8" are brought into engagement with the corresponding grooves 7', 7" in the valve rod. In practice, this involves that the two locking bodies distinctly snap into the grooves and take the position as shown in FIGS. 3 and 12. In a final step, the presser means 15 is brought out of the cavity 11, whereby the locking ring 13 is brought into contact with the locking bodies. In this connection, the ring-shaped ferrule 16 carries the carries the two clamping arms 3, 3' and the tool in its entirety, and the clamping arms leave the locking bodies 9, 9' in immediate connection with the occasion when the locking bodies come into engagement with the seat 14 in the locking ring 13. Thereby, the valve is secured in the intended position and may initiate its intermittent work motions against the action of the valve spring 21.

The advantage of the tool according to the invention is that the clamping arms are capable of holding the two locking bodies in position, in which their front, narrow ends are distanced from the envelope surface on the springingly retroceding tap and on the valve rod. This guarantees on one hand a smooth transfer of the locking bodies from the tap to the valve rod, and on the other hand a distinct engagement between the beads of the locking bodies from the tap to the valve rod precisely at the moment when all beads reach the appurtenant groove. This involves that the tool becomes easy to handle during practical work.

FEASIBLE MODIFICATIONS OF THE INVENTION

The invention is not restricted solely to the embodiment as described and shown in the drawings. Thus, it is possible to produce the clamping arms of another material than sheet-metal, e.g. plastic, and to obtain the necessary support surfaces for the locking bodies in another way than in the shape of inwardly bent material portions in connection with a recess. Thus, it is feasible to shape the inside of the clamping arm with at least one arched support surface with fine tolerances that extends transversally to the arm and forms an acute angle (or is maximally right-angled) to the straight section of the clamping arm. It may also be mentioned that it is not necessary per se to provide the inwardly bent tab portions 20 behind a recess with a pronounced width. Thus, it is possible to punch a narrow slot in the sheet-metal material without removing any material, the sheet-metal material in the region behind the slot being bent inwards in a previously described manner.

What is claimed is:

1. A tool for mounting disk valves in motor cylinder heads, the disk valves being of the type that on its rod (6) has a number of transversal, circumferential grooves (7) for accommodating a corresponding number of beads (8) on the insides of two substantially semi-circularly shaped locking bodies (9, 9'), which taper conically from the rear ends towards the front ends (24, 25) and which have the purpose of securing a locking ring (13) against the spring (12) of a valve, comprising:

a shaft (1), which in the region of one end has a spring-loaded tap (4) that is pressable into an outer cavity in the end portion of the shaft, and, proximate said spring-loaded end, two cross-sectionally vaulted clamping arms (3, 3') that are placed on opposed sides of the shaft, which clamping arms are articulatedly connected with the shaft and activated by at least one spring means (5) that holds the clamping arms (3, 3') swivelled inwards against the shaft (1), and against the action of which the clamping arms are pivotable outwards to a position distal from the shaft (1) and the tap (4), the clamping arms (3, 3') having free end portions incorporating holding means for keeping said locking bodies (9, 9') in a given axial position relative to the clamping arms, in order to allow a transfer of the locking bodies to the valve rod (6), by positioning the tap (4) against the valve rod and pressing the tap into the cavity of the shaft (1), wherein said holding means comprise at least one protrusion (20) which protrudes relative to a cross-sectionally concave and axially straight inside on the free end portion of the individual clamping arm (3, 3') in order to serve as a carrier for the individual locking body, and which has a support surface (21) that is placeable against the rear end (24) of the locking body and extend to said inside in order to hold the convexly vaulted outside (23) of the locking body placed against the concave inside of the clamping arm when the locking body is moved from the tap up to said groove (7) on the valve rod (6), thereby distancing the inner edge on a front narrow end portion (25) of the locking body from external envelope surfaces of the tap (4) and the valve rod (6).

2. Tool according to claim 1, wherein said protrusion consists of inwardly bent material portions (20) immediately behind two recesses or slots (19) in opposed longitudinal edges (18) on the individual clamping arm (3, 3'), an edge surface (21) of the individual protrusion (20) forming said support surface.

3. Tool according to claim 2, wherein the individual edge surface (21) is obliquely positioned relative to the longitudinal extension of the clamping arm at an angle in the range of 60 to 85°.

4. Tool according to claim 3, wherein the individual clamping arm (3, 3'), besides a straight front part (17), has an arched rear part (17') and is connected with the shaft via a pin (26) protruding radially from the shaft, said pin extending through a hole recessed in the clamping arm, in the region between the front and rear parts of the arm, and the spring means consists of an elastic sleeve (5) which at least partly encloses the front straight parts (17) of the two clamping arms (3, 3').

5. Tool according to claim 2, wherein the individual clamping arm (3, 3'), besides a straight front part (17), has an arched rear part (17') and is connected with the shaft via a pin (26) protruding radially from the shaft, said pin extending through a hole recessed in the clamping arm, in the region between the front and rear parts of the arm, and the spring means consists of an elastic sleeve (5) which at least partly encloses the front straight parts (17) of the two clamping arms (3, 3').

6. Tool according to claim 2, wherein the individual edge surface (21) is obliquely positioned relative to the longitudinal extension of the clamping arm at an angle in the range of 70 to 75°.

7. Tool according to claim 1, wherein the individual clamping arm (3, 3'), besides a straight front part (17), has an arched rear part (17') and is connected with the shaft via a pin (26) protruding radially from the shaft, said pin extending through a hole recessed in the clamping arm, in the region between the front and rear parts of the arm, and the spring means consists of an elastic sleeve (5) which at least partly encloses the front straight parts (17) of the two clamping arms (3, 3').

* * * * *